US006111327A

United States Patent [19]

Bae

[11] Patent Number: 6,111,327

[45] Date of Patent: Aug. 29, 2000

[54] AUTOMATIC POWER CUT-OFF DEVICE FOR EMERGENCY SITUATIONS

[76] Inventor: Myung soon Bae, 101-1504 Daeback Apt., 540 Okkye-dong, Gumi-shi, Kyungsangbuk-do, Rep. of Korea

[21] Appl. No.: 09/260,181

[22] Filed: Mar. 1, 1999

[30] Foreign Application Priority Data

May 29, 1998 [KR] Rep. of Korea ...................... 98-19937
Dec. 1, 1998 [KR] Rep. of Korea ...................... 98-52127

[51] Int. Cl.[7] ............................ H02H 7/18; H01H 21/82

[52] U.S. Cl. ........................................... 307/10.7; 200/558

[58] Field of Search .................................. 307/10.7, 116; 200/555, 558, 559; 180/271, 279, 282; 361/179; 335/6, 7, 22, 27, 73, 77, 171, 167, 168, 169, 170, 172, 173, 174, 175, 176, 190, 192

[56] References Cited

U.S. PATENT DOCUMENTS

| | | | |
|---|---|---|---|
| 2,478,691 | 4/1949 | Garrigan et al. | 200/106 |
| 3,602,660 | 8/1971 | Eslinger | 200/61.5 |
| 3,703,617 | 11/1972 | Burnett | 200/61.5 |
| 3,783,211 | 1/1974 | Panettieri | 307/10 |
| 3,821,501 | 6/1974 | Parmenter | 307/10 |
| 3,882,957 | 5/1975 | Fritz | 307/10 |
| 4,000,408 | 12/1976 | McCartney | 307/10 |
| 4,798,968 | 1/1989 | Deem | 307/10 |
| 5,034,620 | 7/1991 | Cameron | 180/282 |
| 5,300,905 | 4/1994 | Kolbas et al. | 335/167 |
| 5,574,316 | 11/1996 | Nieschulz | 307/10.7 |
| 5,818,122 | 10/1998 | Miyazawa et al. | 307/10.7 |
| 5,864,106 | 1/1999 | Hartwig et al. | 200/17 |

*Primary Examiner*—Stephen W. Jackson
*Assistant Examiner*—Rios Roberto
*Attorney, Agent, or Firm*—Darby & Darby

[57] ABSTRACT

An automatic power cut-off device for emergency situations which is capable of immediately sensing occurrence of an emergency situation such as an accident of a vehicle striking against an obstacle during its running at a high speed, and automatically cutting off electric power flowing through the vehicle, thereby protecting a driver or other passengers in the vehicle from fire or explosion. The automatic power cut-off device includes an impact sensing device having an impact sensor adapted to sense an impact, thereby generating an impact sensing signal, and a solenoid driving circuit for activating a solenoid in response to the impact sensing signal. A return knob is also provided which rotates between a first position, in which connecting terminals respectively coupled to an electric power source and a load are electrically connected to each other, and a second position, in which the connecting terminals are disconnected from each other. The return knob is maintained in its first position in an inactive state of the solenoid as it is engaged with an engagement extension provided at the solenoid. When the solenoid is activated, the return knob is disengaged from the engagement extension, so that it rotates to its second position by a tension coil spring. Thus, the supply of electric power is cut off.

8 Claims, 14 Drawing Sheets

AUTOMATIC POWER CUT-OFF DEVICE FOR EMERGENCY SITUATIONS

BACKGROUND OF THE INVENTION

1. Field of the Invention

The present invention relates to an automatic power cutoff device for emergency situations, and more particularly to an automatic power cut-off device for emergency situations which is capable of immediately sensing occurrence of an emergency situation such as an accident of a vehicle or other transportation means striking against an obstacle during its running at a high speed, and automatically cutting off electric power flowing through the transportation means, thereby preventing the transportation means from catching fire or exploding.

2. Description of the Prior Art

Typically, vehicles, in particular, cars, use a DC voltage source as an electric power source thereof. A negative voltage, namely, a ground voltage, is applied to the entire portion of a vehicle required to be supplied with electric power. When the vehicle strikes against an obstacle, positive electric lines existing in the interior of the vehicle may be damaged due to an impact applied to the struck vehicle, so that they may short-circuit with the negative voltage flowing though the vehicle. In such a case, the short-circuited electric lines may serve as heating wires while generating sparks. Where those electric lines come into contact with fuel or oil flowing though the fuel system of the vehicle, or other ignitable material, a firing or explosion may occur. This results in a serious problem in that if there are injured persons in the struck vehicle, they are then in imminent danger of death.

SUMMARY OF THE INVENTION

Therefore, the present invention has been made in view of the above mentioned problems involved in the prior art, and an object of the invention is to provide an automatic power cut-off device for emergency situations which is capable of automatically cutting off electric power output from a battery or generator in a vehicle or other transportation means, which may cause fire or explosion, when an emergency situation occurs due to an accident of a vehicle or other transportation means striking against an obstacle during its running at a high speed, thereby protecting a driver or other passengers in the vehicle or transportation means from fire or explosion.

Another object of the invention is to provide an automatic power cut-off device for emergency situations which can be easily mounted to existing vehicles and other transportation means such as airplanes.

In accordance with one aspect, the present invention provides an automatic power cut-off device for emergency situations comprising: a solenoid electrically connected at one input terminal thereof to an external negative voltage input terminal, said solenoid having an engagement extension reciprocating along a straight path when said solenoid is activated; a pair of connecting terminals arranged in parallel to each other, one of said connecting terminals being electrically connected to an external positive voltage input terminal, and the other one of said connecting terminals being electrically connected to a load; a fixed bar attached at one end thereof to one of said connecting terminals; a pivotal bar electrically connected to the other one of said connecting terminals and pivotally mounted at one end thereof in such a fashion that it pivots between a first position, in which it is in contact with said fixed bar, thereby electrically connecting said connecting terminals with each other, and a second position, in which it is separated from said fixed bar, thereby electrically disconnecting said connecting terminals from each other, said pivotal bar having an engagement portion at the other end thereof; a tension coil spring adapted to urge said pivotal bar toward said second position; a return knob arranged in such a fashion that it pivots two positions respectively corresponding to said first and second positions of said pivotal bar to return said pivotal bar from said second position to said first position against a spring force of said tension coil spring, said return knob said return knob having a first engagement portion engaging with said engagement extension in an inactive state of said solenoid to maintain said pivotal bar at said first position, and a second engagement portion always engaging with said engagement portion of said pivotal bar; and an impact sensing device comprising an impact sensor adapted to sense an impact, thereby generating an impact sensing signal, said impact sensing device allowing a positive voltage from said positive voltage input terminal to be applied to said solenoid for an activation of said solenoid, in response to said impact sensing signal; whereby said engagement extension of said solenoid is disengaged from said first engagement portion of said return knob when said impact sensor senses an impact, so that said pivotal bar pivots to said second position by virtue of said spring force of said tension coil spring, thereby cutting off the supply of said positive voltage.

In accordance with another aspect, the present invention provides an automatic power cut-off device for emergency situations comprising: a case; a motor electrically connected at one terminal thereof to an external negative voltage input terminal, said motor having a gear fixedly mounted to a rotating shaft thereof; a rotating disk rotatably mounted on a desired portion of said case, said rotating disk having a gear portion formed along a peripheral surface of a half portion thereof and adapted to engage with said gear of said motor, and a pair of protrusions protruded from a peripheral surface of the remaining half portion thereof, said protrusions being spaced from each other by a desired angle, said rotating disk also having a cylindrical member centrally arranged thereon, and a conductor member extending diametrically through said cylindrical member in such a fashion that it is integral with said cylindrical member; a support member arranged adjacent to one of said protrusions of said rotating disk, said support member having a pair of guide grooves; a pair of connecting terminals arranged in parallel to each other, one of said connecting terminals being electrically connected at one-side end thereof to an external positive voltage input terminal, and the other one of said connecting terminals being connected at one-side end thereof to a load; a pair of connecting bars fixed at respective one-side ends thereof to respective other-side ends of said connecting terminals, said connecting bars extending through said guide grooves of said support member in parallel to each other and having a pair of contact terminal tips attached to respective other-side ends thereof and selectively in contact with opposite surfaces of said conductor member, respectively; an impact sensing device comprising an impact sensor adapted to sense an impact, thereby generating an impact sensing signal, said impact sensing device allowing a positive voltage from said positive voltage input terminal to be applied to said motor for a rotation of said motor, in response to said impact sensing signal; and a pair of switching units arranged at opposite sides of said rotating disk, respectively, said switching units being switched to their open states by a force applied thereto from said protrusions of said rotating disk, thereby cutting off the application of said positive voltage to said motor so as to stop said motor, respectively; whereby said rotating disk rotates as said motor rotates when said impact sensor senses an impact, so that said contact terminal tips of said connecting bars are separated from said conductor member, thereby cutting off the supply of said positive voltage.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
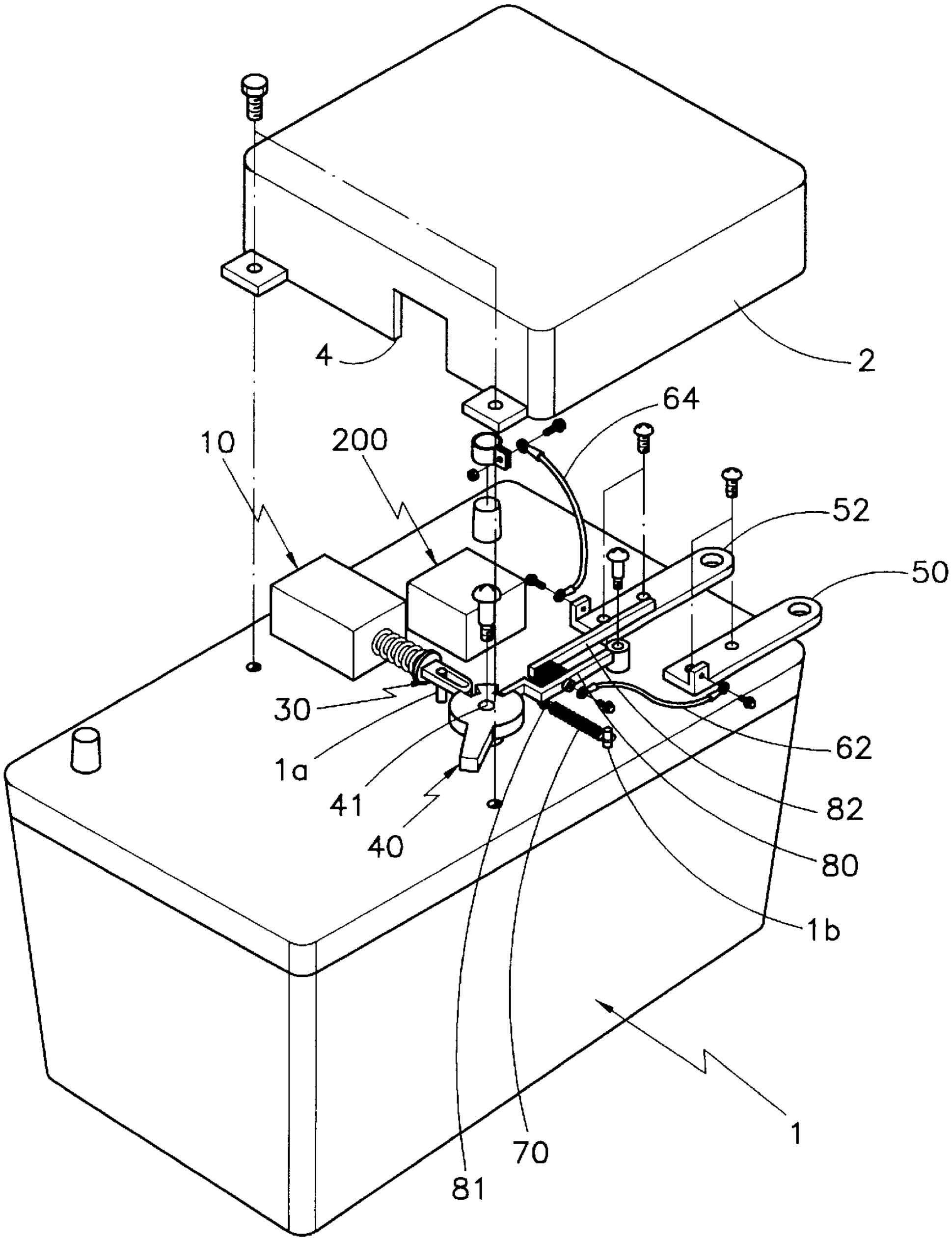
FIG. 1 is an exploded perspective view illustrating an automatic power cut-off device for emergency situations in accordance with a first embodiment of the present invention.
Figure 2:
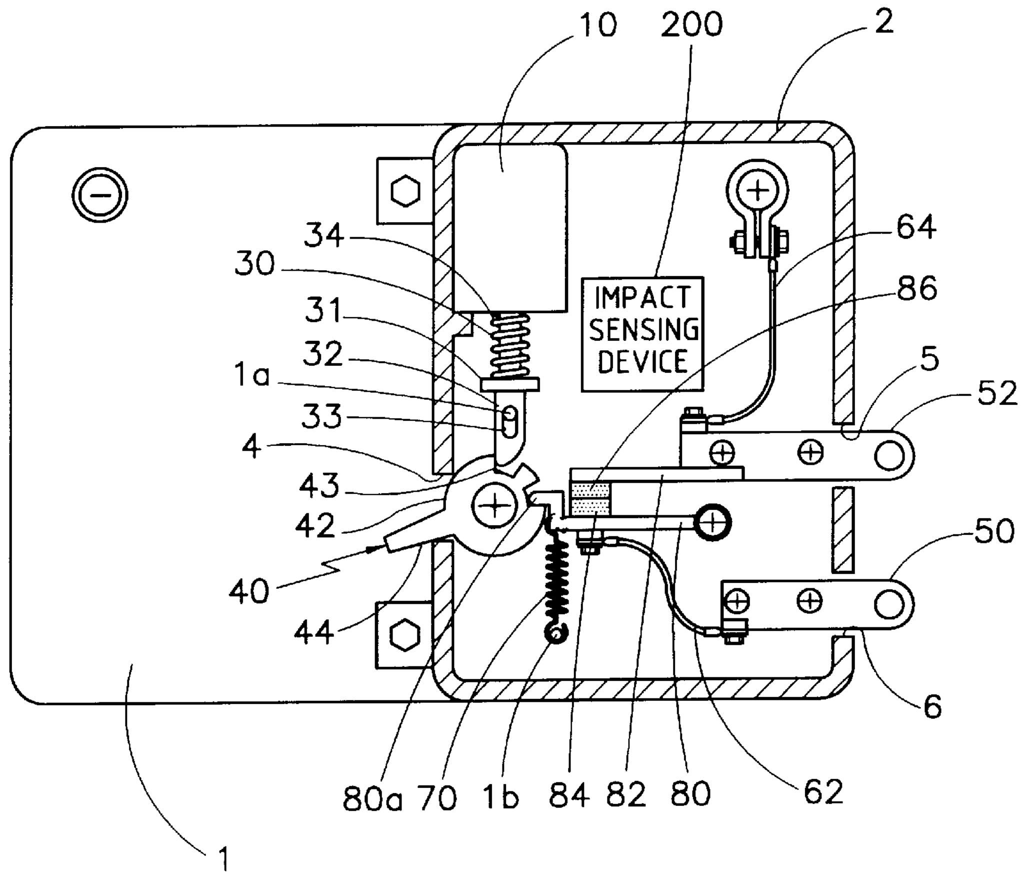
FIG. 2 is a planar sectional view of FIG. 1.

Referring to FIGS. 1 and 2, an automatic power cut-off device for emergency situations in accordance with a first embodiment of the present invention is illustrated. As shown in FIGS. 1 and 2, the automatic power cut-off device is installed on the upper surface of a battery case 1 mounted at a desired place in the interior of a vehicle and adapted as an electric power source. In the figures, the reference numeral 10 denotes a general solenoid mounted on the upper surface of the battery case 1. The solenoid 10 has a configuration in which when current flows through the solenoid 10, a magnetic core (not shown) included in the solenoid 10 is magnetized, thereby causing a plunger (not shown) to reciprocate along a straight path. The reference numeral 30 denotes an extension rod connected at one end thereof to the plunger and adapted to reciprocate in a straight path in accordance with the reciprocation of the plunger. The extension rod 30 is surrounded by a compression coil spring 34 and provided at the other end thereof with an extension 32. The extension 32 has a longitudinal slot 33 engaging with an engagement protrusion 1*a* protruded from the upper surface of the battery case 1. In FIG. 2, the reference numeral 31 denotes a support member provided at the end of the extension rod 30 connected to the plunger and adapted to support the compression coil spring 34. When no current flows through the solenoid 10, the extension rod 30 is maintained in a most protruded state by virtue of a spring force provided by the compression coil spring 34.

The reference numeral 40 denotes a return knob pivotally mounted on the upper surface of the battery case 1 and centrally provided with a through hole 41. The return knob 40 has a pair of grooves 43 at desired portions of the peripheral surface thereof, respectively. The grooves are spaced by a desired angle, for example, 90°. Opposite to the grooves 43, the return knob 40 also has a knob portion 44 extending radially outwardly from the peripheral surface thereof.

The reference numeral 50 denotes a connecting terminal which is a main positive voltage input terminal of the vehicle which is fixedly mounted on the upper surface of the battery case 1 at one end thereof. The reference numeral 52 denotes a connecting terminal which is a positive voltage terminal mounted on the upper surface of the battery case 1 at one end thereof while being slightly spaced from the main positive voltage input terminal 50. The connecting terminal 52 is electrically coupled at one end thereof to a positive terminal of the battery via a connecting cable 64 and at the other end thereof to a generator (not shown) included in an engine of the vehicle.

The reference numeral 80 denotes a pivotal bar pivotally mounted on the upper surface of the battery case 1 at one end thereof between the connecting terminals 50 and 52. The pivotal bar 80 has a straight portion extending by a desired length and is provided at the other end thereof with a 180°-inverted L-shaped engagement portion 80*a*. The pivotal bar 80 is electrically connected to the connecting terminal 50 by means of a connecting cable 62.

The reference numeral 82 is a fixed bar having substantially the same length as the straight portion of the pivotal bar 80 and being arranged in parallel to the pivotal bar 80. The fixed bar 82 is fixedly mounted on the connecting terminal 52 at an end thereof. The pivotal bar 80 and fixed bar 82 have contact terminal tips 84 and 86 at facing surfaces thereof, respectively. The fixed bar 82 is selectively electrically connected with the pivotal bar 80 as the contact terminal tips 84 and 86 come into contact with each other.

A protrusion 81 is downwardly protruded from the lower surface of the pivotal bar 80 to support one end of a tension coil spring 70 which is mounted on the upper surface of the battery case 1 at the other end thereof. By virtue of the tension coil spring 70, the pivotal bar 80 is always urged in pit a direction in which it is spaced away from the fixed bar 82, thereby causing the contact terminal tips 84 and 86 to be separated from each other.

The extension 32 of the solenoid 10 is selectively engaged at the tip thereof with one groove 43 of the return knob 40 whereas the engagement portion 80*a* of the pivotal bar 80 is always engaged with the other groove 43 of the return knob 40. The reference numerals 4, 5 and 6 denote grooves formed at opposite side walls of a cover 2 for covering the above mentioned elements installed on the upper surface of the battery case 1.

The reference numeral 200 denotes an impact sensing device including an impact sensor which will be described hereinafter.

Figure 3A:
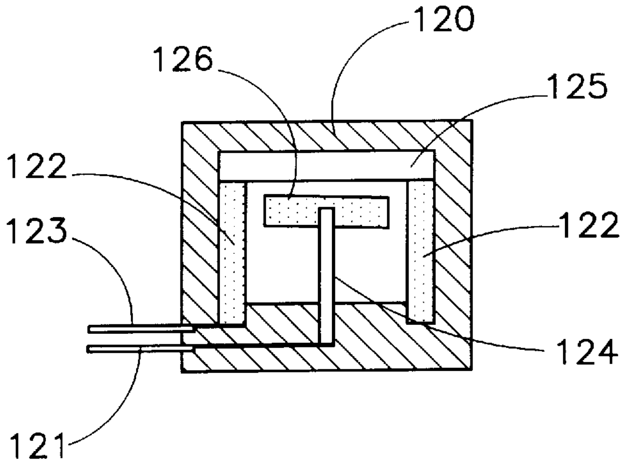
FIG. 3*a* is an elevational sectional view illustrating an impact sensor according to the first embodiment of the present invention.
Figure 3B:
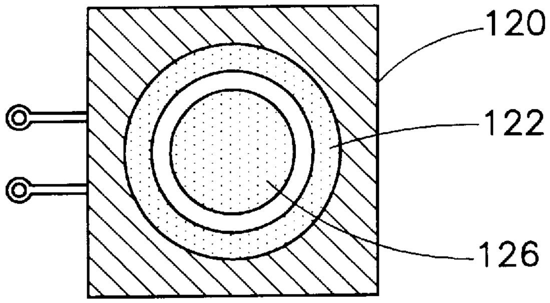
FIG. 3*b* is a planar sectional view of FIG. 3*a;*
Figure 4:
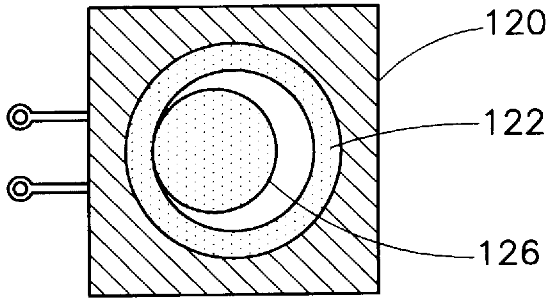
FIG. 4 is a planar sectional view similar to FIG. 3*b*, but illustrating an activation of the impact sensor.

Meanwhile, FIGS. 3*a* and 3*b* are elevational and planar sectional views schematically illustrating the impact sensor, respectively. FIG. 4 is a planar sectional view illustrating an operation of the impact sensor shown in FIG. 3*b*. In the figures, the reference numeral 120 denotes a box-shaped sensor case horizontally arranged in a running direction of the vehicle and defined with a cylindrical space 125 therein. The sensor case 120 has a sealed construction to prevent dust or other foreign matters from entering the circular space 125. The reference numeral 122 denotes a cylindrical contact ring fitted in the cylindrical space 125 in such a fashion that its outer surface is in contact with the inner side surface of the sensor case 120. The contact ring 122 has a lower end fitted in a circular groove defined at the inner bottom surface of the sensor case 120. The reference numeral 124 denotes an impact sensing spring vertically arranged in the cylindrical space 125 and centrally inserted into the bottom wall of the sensor case 120 at the lower end thereof. A contact weight 126 is mounted to the upper end of the impact sensing spring 124. When an impact is externally applied to the sensor case 120 at a predetermined speed or above, the impact sensing spring 124 is bent, thereby causing the contact weight 126 to come into contact with the contact ring 122.

The reference numerals 121 and 123 denote connecting terminals each extending horizontally through the bottom wall of the sensor case 120 and having one end outwardly exposed at the outer side surface of the sensor case 120 and the other end inserted into the bottom wall of the sensor case 120. The connecting terminal 123 is electrically connected at one end thereof to the negative terminal of the battery and at the other end thereof to the contact ring 122. The connecting terminal 121 is electrically connected to the impact sensing spring 124 and serves as a sensor output terminal.

Figure 5:
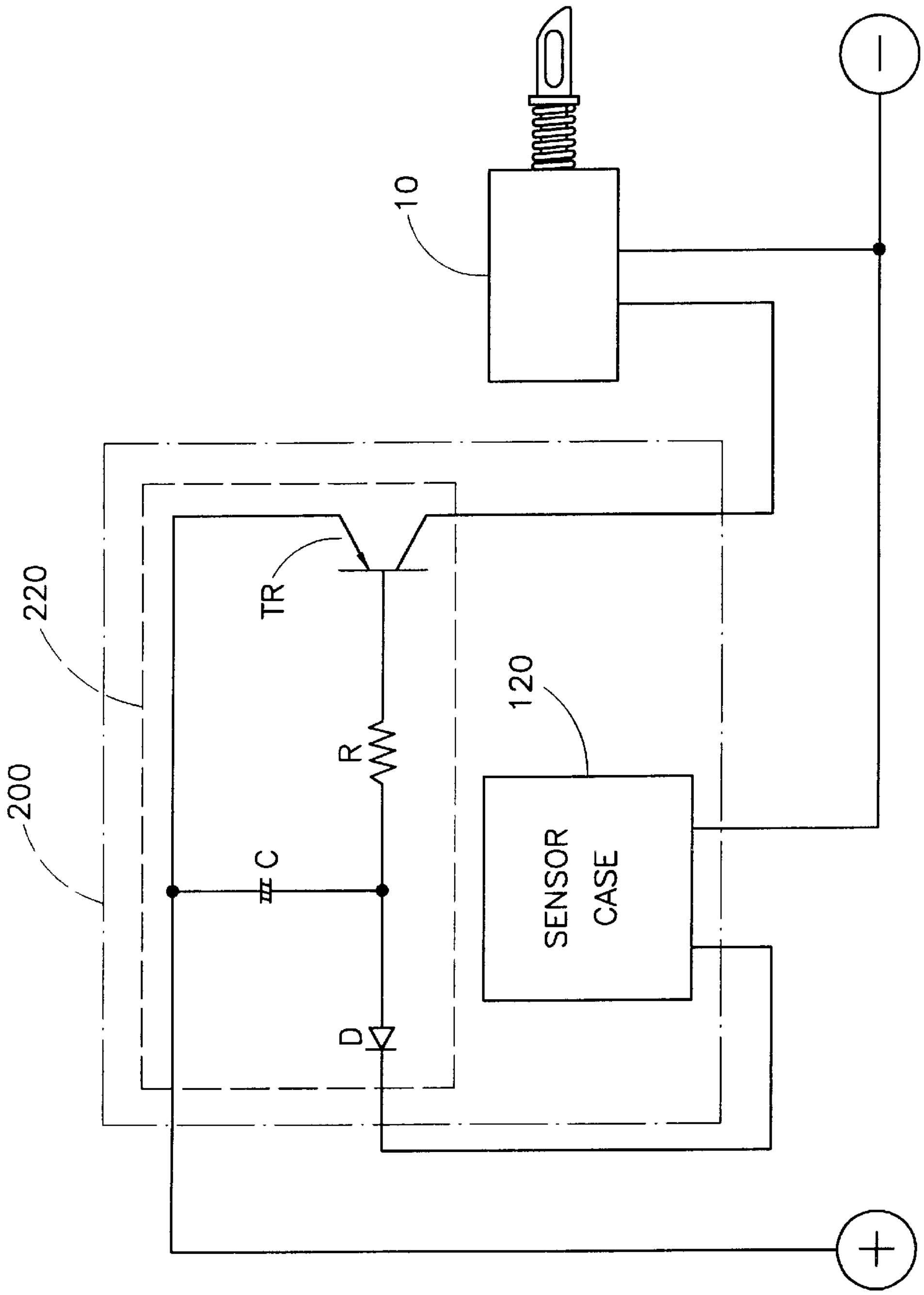
FIG. 5 is a circuit diagram illustrating an electrical circuit used in the automatic power cut-off device shown in FIG. 1.

FIG. 5 is a circuit diagram illustrating an electrical circuit used in the automatic power cut-off device shown in FIG. 1. As shown in FIG. 5, the solenoid 10 is electrically connected at its negative input terminal to the negative terminal of the battery and at its positive terminal to the collector of a PNP type transistor TR included in a solenoid driving circuit 220. The solenoid driving circuit 220 is included in the impact sensing device 200. As described in conjunction with FIG. 4, the connecting terminal 123 of the impact sensing device 200 is selectively electrically connected to the sensor output terminal 121. The sensor output terminal 121 is electrically coupled to the base of the transistor TR via a diode D and a resistor R. The transistor TR of the solenoid driving circuit 220 is coupled at the emitter thereof to the positive terminal of the battery. A capacitor C is coupled at the negative terminal thereof between the resistor R and diode D. The positive terminal of the capacitor C is connected to the positive terminal of the battery.

In a state shown in FIG. 2, the connecting terminals 50 and 52 are electrically connected to each other, so that a positive voltage from the battery is supplied to the generator (not shown) of the engine via the positive terminal of the battery. This state corresponds to a normal running state of the vehicle. In this state, the impact sensing device 200 is maintained in such a fashion that the contact weight 126 is spaced from the contact ring 122, as shown in FIG. 3*b*. Accordingly, no current is supplied to the solenoid 10, thereby preventing the magnet core of the solenoid 10 from being magnetized. That is, the solenoid 10 is maintained in its inactive state. As a result, the extension 32 of the solenoid 10 is maintained at its extended position in which it is engaged with the associated groove 43. Thus, the connection of the connecting terminals 50 and 52 is maintained.

Figure 6:
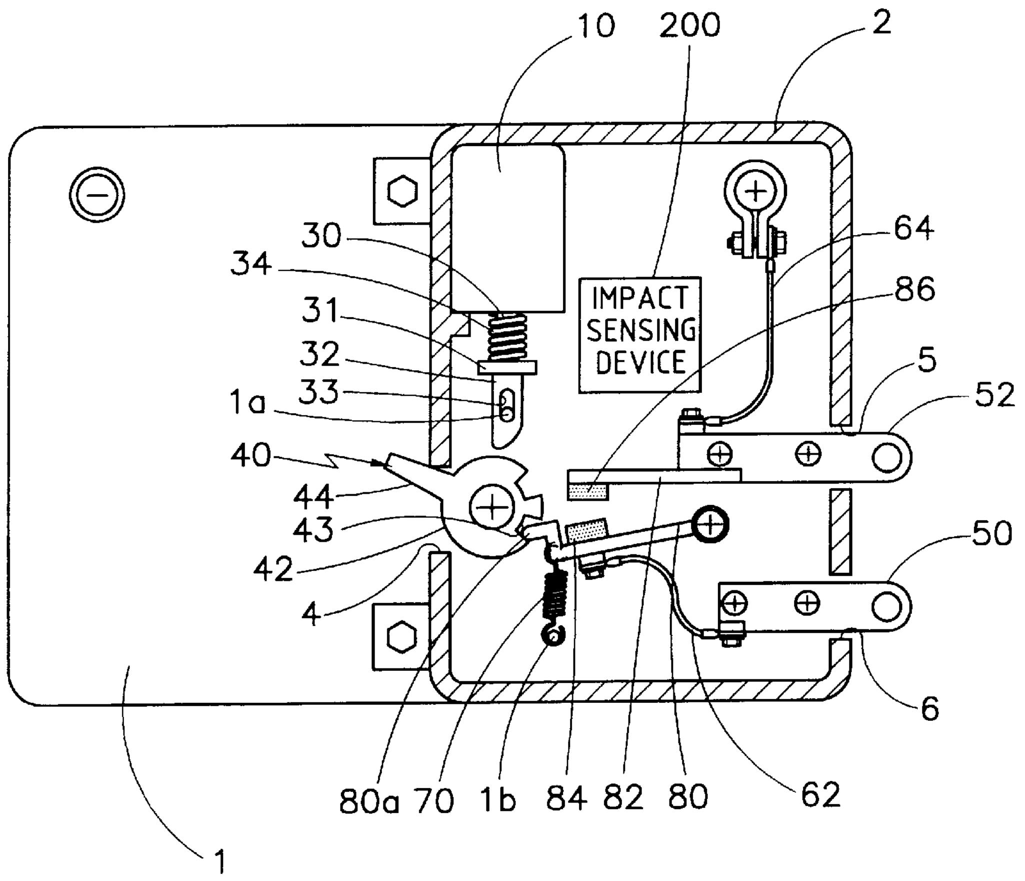
FIG. 6 is a planar sectional view similar to FIG. 2, but illustrating an operating state of the automatic power cut-off device according to the first embodiment of the present invention.

When the vehicle equipped with the above mentioned power cut-off device strikes against an obstacle, the impact sensing spring 124 provided in the impact sensor is bent due to an impact generated upon the striking of the vehicle, so that the contact weight 126 comes into contact with the contact ring 122, as shown in FIG. 4. As a result, the sensor output terminal 121 is electrically connected to the connecting terminal 123 via the connected contact ring 122 and contact weight 126. That is, an impact sensing signal from the sensor output terminal 121 is applied to the base of the transistor TR via the diode D and resistor R, thereby causing the transistor TR to be switched on. As a result, current is supplied to the solenoid 10, so that the magnet core of the solenoid 10 is magnetized to serve as an electromagnet. Accordingly, the extension 32 retracts immediately and disengages from the associated groove 43. This causes the pivotal bar 80 to pivot by virtue of the spring force of the tension coil spring 70 while pivoting the return knob 40. Thus, the connecting terminals 50 and 52 are disconnected from each other, as shown in FIG. 6. In this state resulting from the striking of the vehicle, the supply of main electric power from the battery to the vehicle is cut off. In this state, the supply of output current from the generator to the engine is also cut off because the connecting terminal 52 coupled to the generator is in a state disconnected from the connecting terminal 50.

Since the transistor TR of the solenoid driving circuit 220 is maintained at its ON state for the charging time of the capacitor C, the solenoid 10 is continuously activated even though the impact sensor is in its conductive state for an instantaneous time. The solenoid 10 is inactivated again after a predetermined time, so that the extension 32 of the solenoid 10 extends by virtue of the spring force of the compression coil spring 34 while coming into contact with the peripheral surface of the return knob 40.

On the other hand, where the vehicle is slightly damaged due to the striking thereof without any injury of the driver and other passengers in the vehicle, the driver manually pivot the return knob 40 to the original position of FIG. 2 by applying a desired force to the knob portion 44 protruded from the return knob 40 outwardly of the battery case 1, in order to electrically connect again the connecting terminals 50 and 52 with each other. As a result, the supply of main electric power from the battery to the vehicle is enabled again. Accordingly, the vehicle can be run again. In this state, the extension 32 of the solenoid 10 is engaged with the associated groove 43 of the return knob 40, thereby maintaining the return knob 40 at its original position. That is, the connecting terminals 50 and 52 are maintained in their connected state.

Figure 7:
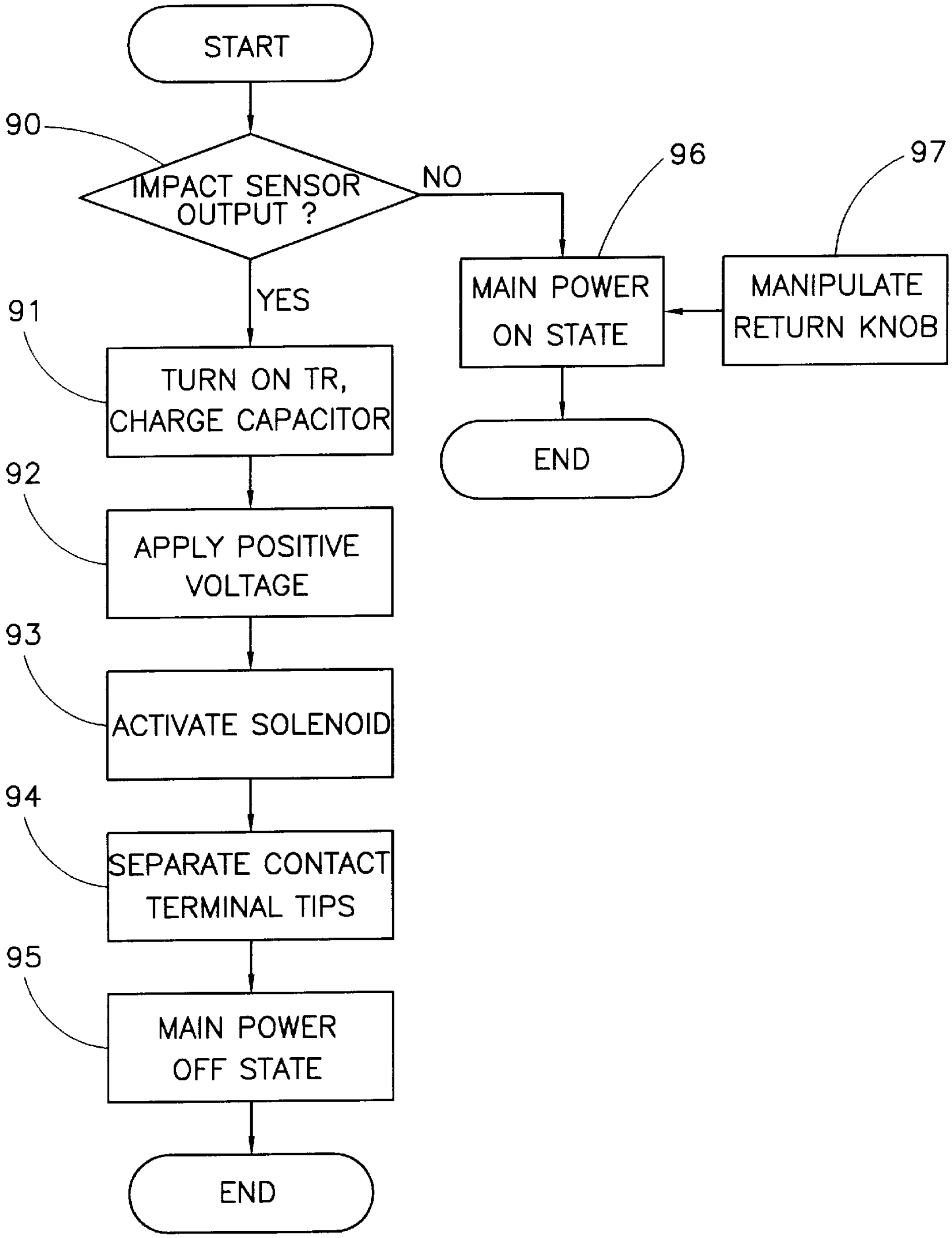
FIG. 7 is a flow chart illustrating an operation of the automatic power cut-off device in accordance with the first embodiment of the present invention.

FIG. 7 is a flow chart illustrating an operation of the automatic power cut-off device in accordance with the first embodiment of the present invention. As shown in FIG. 7, when the impact sensor generates an impact sensing output at step 90 as it is switched to its conductive state, the transistor TR is switched to its ON state, and the capacitor C is charged (Step 91). As a result, positive voltage is applied to the solenoid 10 (Step 92) which is, in turn, activated (Step 93). Accordingly, the contact terminal tips 84 and 86 are separated from each other (Step 94), thereby causing the main power source to be switched to its OFF state (Step 95). That is, the supply of main power from the battery is cut off. On the other hand, where the impact sensor is in its non-conductive state, the main power source is maintained in its ON state (Step 96). Where the main power source is in its OFF state in accordance with the operation carried out at step 95, it can be switched to its ON state by pivoting the return knob 40 (Step 97).

Referring to FIGS. 8 to 13, an automatic power cut-off device for emergency situations in accordance with a second embodiment of the present invention is illustrated.

In the figures, the reference numeral 110 denotes a motor mounted on the upper surface of the battery case 1 and adapted to generate a drive force in response to an application of a drive voltage thereto. A gear 112 having a desired diameter is fixedly mounted to a rotating shaft of the motor 110. The reference numeral 130 denotes a rotating disk rotatably mounted on the upper surface of the battery case 1. The rotating disk 130 has a gear portion 131 formed along the peripheral surface of a half portion of the rotating disk 130 and adapted to engage with the gear 112 of the motor 110. The rotating disk 130 is also provided with a pair of protrusions 136 and 138 protruded from the peripheral surface of the remaining half portion of the rotating disk 130. The protrusions 136 and 138 are spaced from each other by a desired angle, for example, about 90°. A cylindrical member 132 is centrally arranged on the rotating disk 130. A conductor member 134 extends diametrically through the cylindrical member 132 in such a fashion that it is integral with the cylindrical member 132.

The reference numerals 140 and 142 denote a first switching unit and a second switching unit arranged on the upper surface of the battery case 1 at opposite sides of the rotating disk 130, respectively. The first switching unit 140 includes a push button switch 140*a*, and a resilient member 140*b* adapted to depress the push button switch 140*a*, thereby causing the push button switch 140*a* to be switched to its open state. The resilient member 140*b* is arranged in such a fashion that it can be depressed by the protrusion 136 of the rotating disk 130. Similarly to the first switching unit 140, the second switching unit 142 includes, a push button switch 142*a* and a resilient member 142*b*. The resilient member 142*b* is arranged in such a fashion that it can be depressed by the protrusion 138 of the rotating disk 130.

The reference numeral 160 denotes a rectangular support member fixedly mounted on the upper surface of the battery case 1 at a position adjacent to the protrusion 138 of the rotating disk 130. The support member 160 has a pair of guide grooves 162 each having a desired width and desired height.

The reference numerals 150 and 152 denote connecting terminals each mounted on the upper surface of the battery case 1 while being protruded at one end thereof outwardly of the battery case 1. The connecting terminal 150 serves as a main positive voltage input terminal of the vehicle. The connecting terminal 152 is connected to the output terminal of the generator (not shown).

A pair of connecting bars 154 and 156 are fixed at respective one-side ends thereof to respective other-side ends of the connecting terminals 150 and 152. The connecting bars 154 and 156 extend through the guide grooves 162 of the support member 160 in parallel to each other. A pair of contact terminal tips 155 and 157 are attached to respective other-side ends of the connecting bars 154 and 156. The contact terminal tips 155 and 157 are in contact with the opposite surfaces of the conductor member 134, respectively. The connecting bar 156 is also connected to the positive terminal of the battery.

The reference numeral 300 denotes an impact sensing device which is configured in accordance with the second embodiment of the present invention, but including the impact sensor 120 used in the first embodiment of the present invention.

The reference numerals 5 and 6 denote grooves formed at one side wall of a cover 3 for covering the above mentioned elements installed on the upper surface of the battery case 1.

Figure 8:
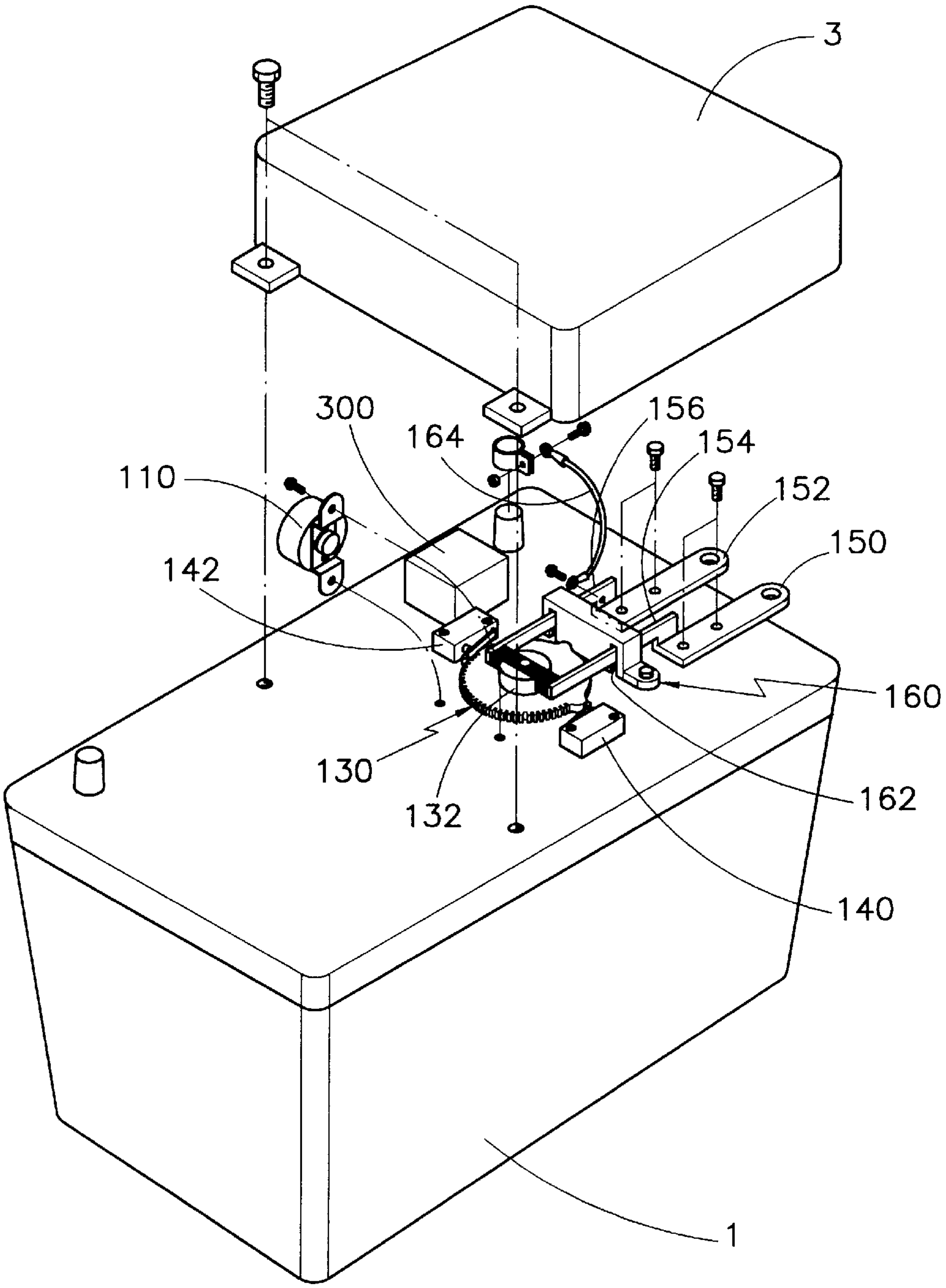
FIG. 8 is an exploded perspective view illustrating an automatic power cut-off device for emergency situations in accordance with a second embodiment of the present invention.
Figure 9:
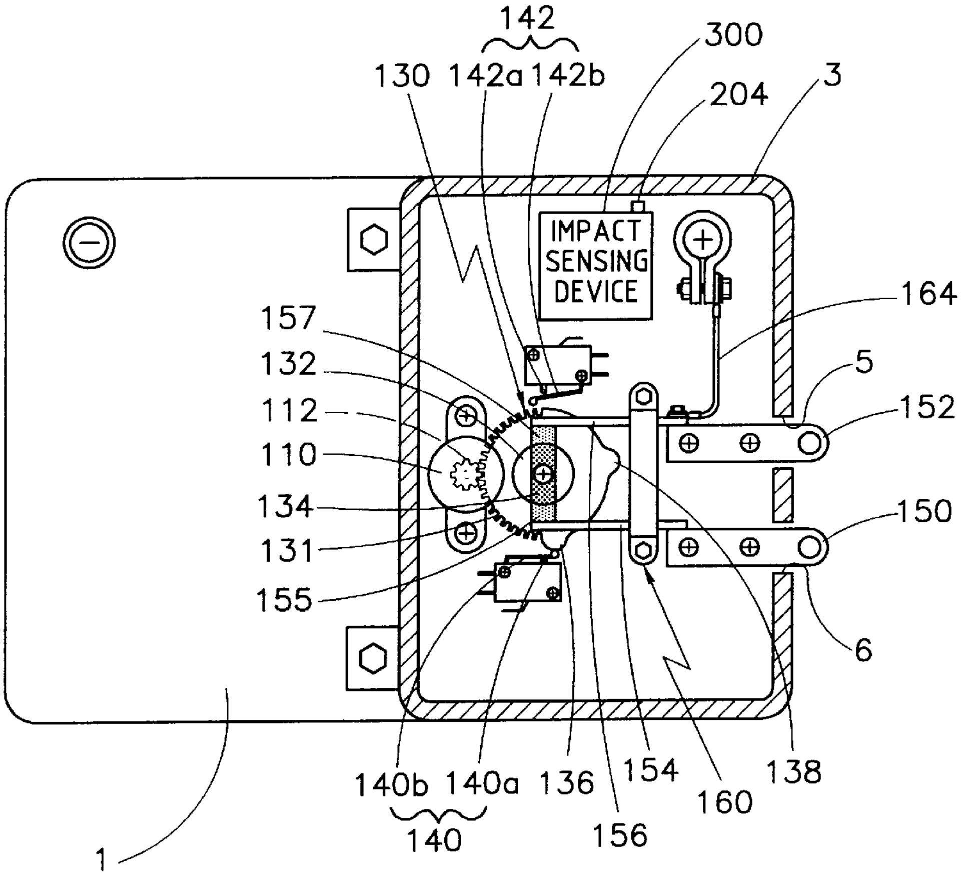
FIG. 9 is a plan view of FIG. 8.

FIG. 8 is an exploded perspective view illustrating the automatic power cut-off device of the second embodiment which is in an inactive state. FIG. 9 is a plan view of FIG. 8. As shown in FIGS. 8 and 9, the contact terminal tips 155 and 157 of the connecting bars 154 and 156 are in contact with the conductor member 134 of the rotating disk 130. In the state shown in FIGS. 8 and 9, the first switching unit 140 is in its open state because the resilient member 140*b* thereof is depressed by the first protrusion 136 of the rotating disk 130, thereby causing the push button switch 140*a* to be in its open state. In this state, the motor 110 is in a braked state.

Figure 10:
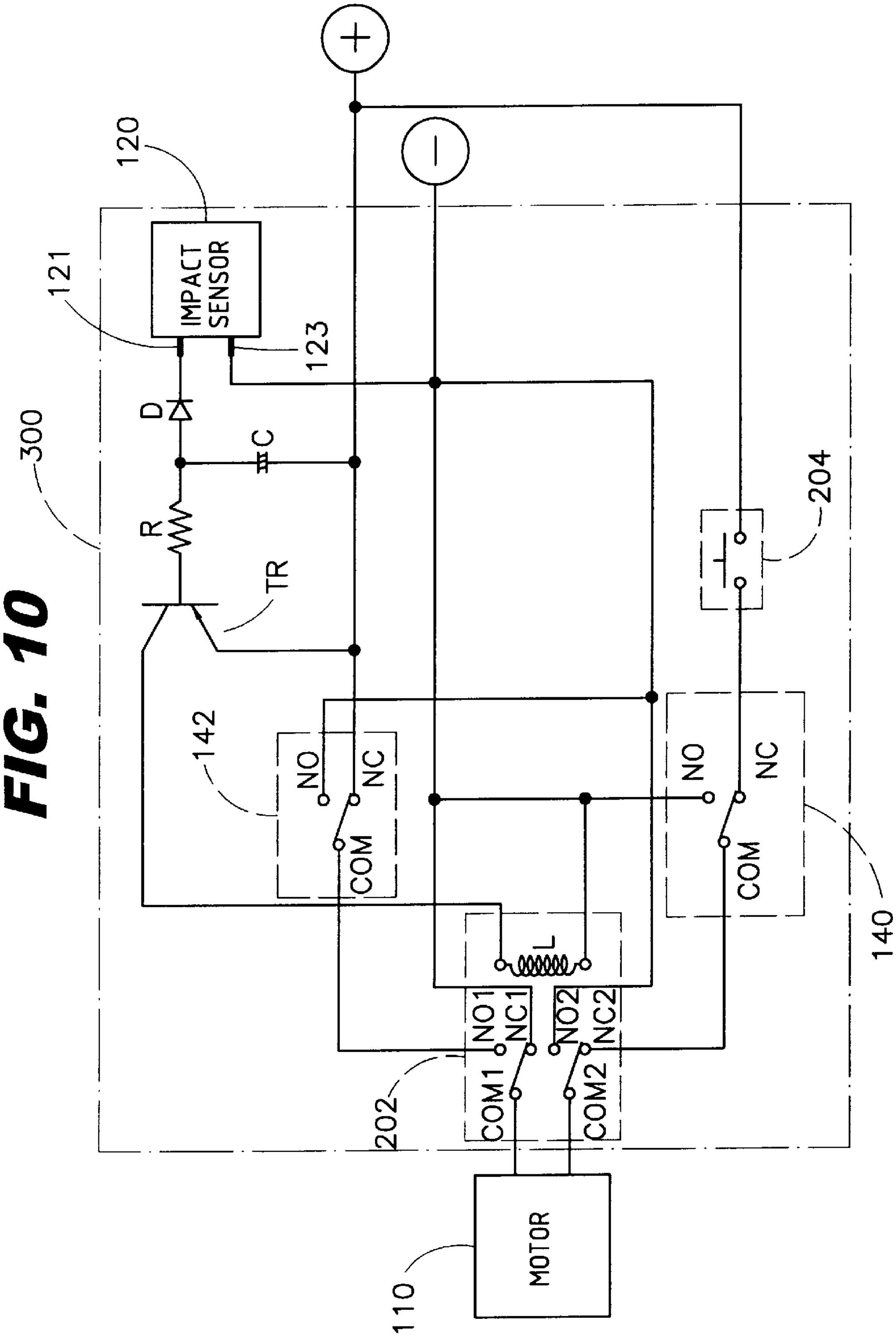
FIG. 10 is a circuit diagram illustrating an electrical circuit used in the automatic power cut-off device shown in FIG. 8.

FIG. 10 is a circuit diagram illustrating an electrical circuit used in the automatic power cut-off device shown in FIG. 8. In FIG. 10, the reference numeral 202 denotes a motor switching unit which includes a pair of common terminals COM1 and COM2, and an inductor coil L. The motor switching unit 202 also includes a pair of opening contacts NO1 and NO2, and a pair of closing contacts NC1 and NC2. The common terminals COM1 and COM2 are selectively connected to associated opening contacts NO1 and NO2 or associated closing contacts NC1 and NC2, respectively, in accordance with an operation of the inductor coil L. That is, the motor switching unit 202 is normally maintained in a state in which the common terminals COM1 and COM2 are connected to the associated closing contacts NC1 and NC2, respectively. When the inductor coil L is energized, the motor switching unit 202 is switched to a state in which the common terminals COM1 and COM2 are connected to the associated opening contacts NO1 and NO2, respectively.

The first switching unit 140 has a common terminal COM coupled to the opening contact NO0 of the motor switching unit 202, a closing contact NC, and an opening contact NO. The opening contact NO of the first switching unit 140 is coupled to one end of the inductor coil L of the motor switching unit 202 and to the negative terminal of the battery. The second switching unit 142 has a common terminal COM coupled to the closing contact NC2 of the motor switching unit 202, a closing contact NC, and an opening contact NO. The opening contact NC of the second switching unit 142 is coupled to the positive terminal of the battery. The opening contact NO of the second switching unit 142 is connected to the opening contact NO2 of the motor switching unit 202. Both the first and second switching units 140 and 142 are normally maintained in a state in which their common terminals COM are connected to the associated closing contacts NC, respectively. When the push button switches 140*a* and 142*a* are depressed by the protrusions 136 and 138 of the rotating disk 30, respectively, the first and second switching units 140 and 142 are switched to a state in which their common terminals COM are connected to the associated opening contacts NO, respectively.

The reference numeral 204 denotes a return push button switch coupled at one terminal thereof to the closing contact NC of the first switching unit 140 and at the other terminal thereof to the positive terminal of the battery. The return push button switch 204 is normally maintained in its OFF state, but switched to its ON state in accordance with a pushing manipulation of the user. The ON state of the return push button switch 204 is maintained only when the pushing force of the user applied to the return push button switch 204 is maintained.

The impact sensor used in the second embodiment of the present invention is contained in the impact sensor case 120. The connecting terminal 123 of the impact sensor is connected to the negative terminal of the battery whereas the sensor output terminal 121 is coupled to the base of a PNP transistor TR via a diode D and a resistor R which are connected together in series. The transistor TR is coupled at the collector thereof to the other end of the inductor coil L of the motor switching unit 202 and at the emitter thereof to the positive terminal of the battery. The emitter of the transistor TR is also connected to the closing contact NC of the second switching unit 142. A capacitor C is coupled at one terminal thereof to a node between the resistor R and diode D and at the other terminal thereof to the positive terminal of the battery.

Figure 12:
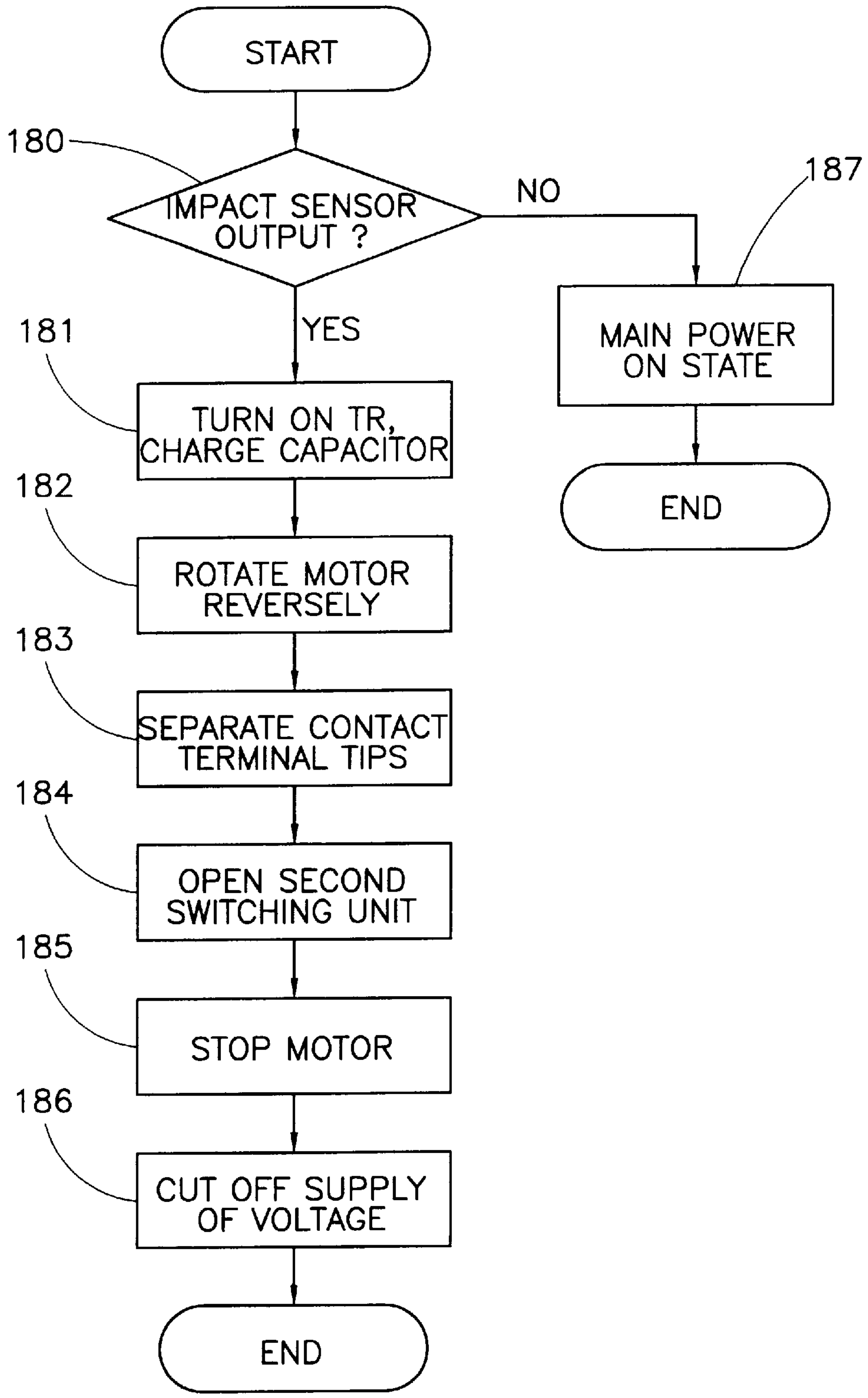
FIG. 12 is a flow chart illustrating a power cut-off operation of the automatic power cut-off device in accordance with the second embodiment of the present invention.

Now, the operation of the automatic power cut-off device using the above mentioned impact sensing device in accordance with the second embodiment of the present invention will be described in conjunction with FIG. 12.

When the vehicle equipped with the above mentioned power cut-off device strikes against an obstacle, the impact sensing spring 124 of the impact sensing device 300 is bent due to an impact generated upon the striking of the vehicle, so that the contact weight 126 comes into contact with the contact ring 122. As a result, the sensor output terminal 121 is electrically connected to the connecting terminal 123 via the connected contact ring 122 and contact weight 126. As a result, the impact sensor is switched to its conductive state. That is, the impact sensor generates an impact sensing output, namely, a negative voltage, at step 180. In this state, the transistor TR is switched to its ON state, and the capacitor C is charged (Step 181). Simultaneously, the inductor coil L, which is coupled to the negative terminal of the battery, is activated. Accordingly, the motor switching unit 202 of the impact sensing device 300 is switched in a state in which the common terminals COM1 and COM2 thereof are in contact with the associated opening contacts NO1 and NO2, respectively. Therefore, the motor 110 receives a negative input voltage applied via the opening contact NO2 and common terminal COM2 of the motor switching unit 202 and a positive input voltage applied via the opening terminal NO1 and common terminal COM2 of the motor switching unit 202, so that it rotates in a reverse direction, namely, in the counter-clockwise direction of FIG. 9 (Step 182). As the motor 110 rotates reversely, the conductor member 134 on the rotating disk 130 is separated from the contact terminal tips 155 and 157 of the connecting bars 154 and 156 (Step 183). Although the supply of electric power is substantially cut off in this state, the rotating disk 130 is further rotated by virtue of the inertial rotation of the motor 110, so that the protrusion 138 thereof depresses the push button switch 142*a* of the second switching unit 142, thereby causing the push button switch 142*a* to be switched to its open state (Step 184). In the open state of the push button switch 142*a*, the motor 110 is braked and so completely stopped (Step 185). Thus, the power cut-off state is maintained (Step 186).

Figure 11:
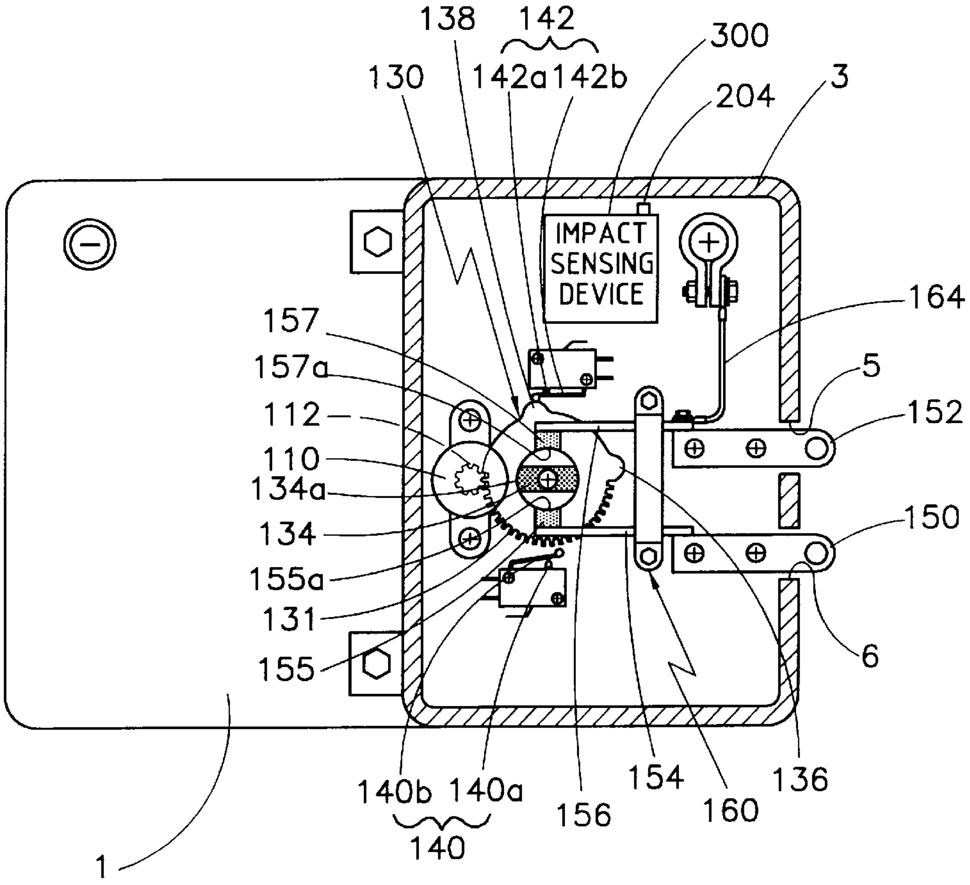
FIG. 11 is a plan view similar to FIG. 9, but illustrating an operating state of the automatic power cut-off device according to the second embodiment of the present invention.

In respective states of FIGS. 9 and 11, the motor 110 is maintained in a stopped state as it is braked.

The power cut-off state is continued during a continued operation of the impact sensor. Even when the impact sensor is switched to its conductive state and then immediately returned to its non-conductive state, the motor 110 rotates continuously for the charging time of the capacitor C. Such a rotation of the motor 110 ensures a desired power cut-off even when the impact sensor is in its conductive state for an instantaneous time.

Figure 13:
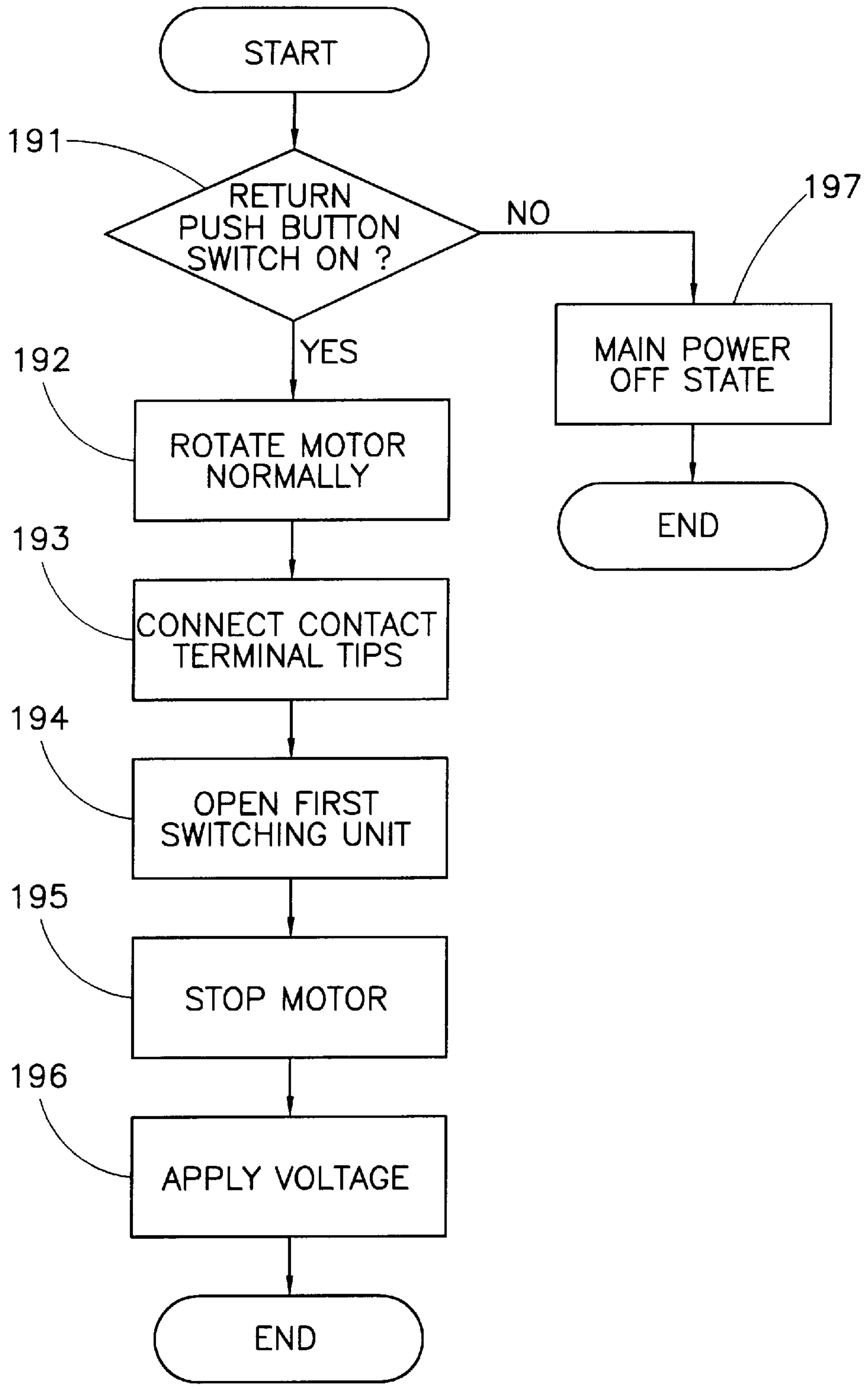
FIG. 13 is a flow chart illustrating a power supply operation of the automatic power cut-off device in accordance with the second embodiment of the present invention.

On the other hand, when the user is desired to supply again the electric power from the battery to the vehicle, thereby running again the vehicle, he first switches on the return push button switch 204 (Step 191 of FIG. 13). In the ON state of the return push button switch 204, the motor 110 receives a positive input voltage applied via the closing terminal NC and common terminal COM of the first switching unit 140 and the closing contact NC2 and common terminal COM2 of the motor switching unit 202, and receives a negative input voltage applied via the closing contact NC1 and common terminal COM1 of the motor switching unit 202. Accordingly, the motor 110 rotates in a normal direction, namely, in the clockwise direction of FIG. 11 (Step 192). The rotation of the motor 110 is continued until the protrusion 136 of the rotating disk 130 depresses the push button switch 140*a* of the first switching unit 140. In this state, the conductor member 134 of the rotating disk 130 is aligned with the contact terminal tips 155 and 157 of the connecting bars 154 and 156 while being in contact with those contact terminal tips (Step 193). As the protrusion 136 of the rotating disk 130 depresses the push button switch 140*a* of the first switching unit 140, the common terminal COM and opening contact NO of the first switching unit 140 come into contact with each other, thereby causing the first switching unit 140 to be switched to its open state (Step 194). As a result, the supply of the positive voltage is cut off. This results in a motor braking state in which the motor 110 is stopped (Step 195). Simultaneously, the electric power from the battery is supplied to the vehicle (Step 196).

Since the operation of the impact sensor in the second embodiment of the present invention is the same as in the first embodiment, its detailed description is omitted.

Figure 14:
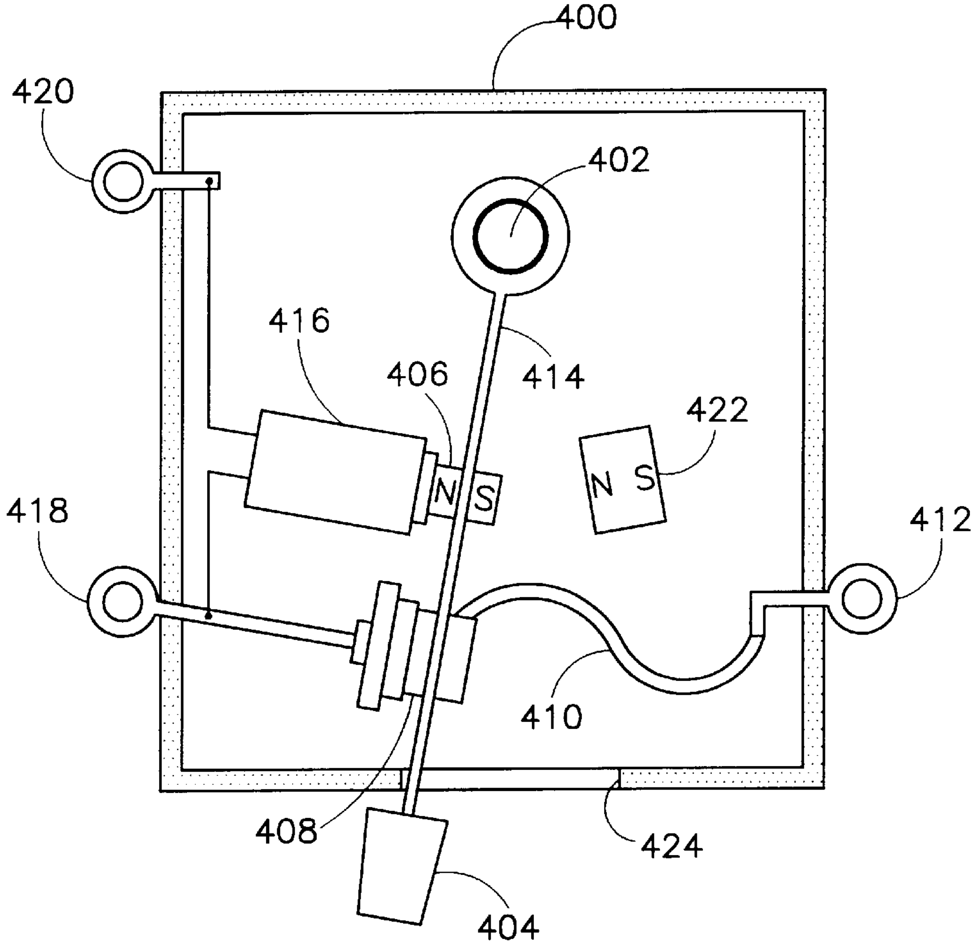
FIG. 14 is a sectional view illustrating an automatic power cut-off device for emergency situations in accordance with a third embodiment of the present invention.

Referring to FIG. 14, an automatic power cut-off device for emergency situations in accordance with a third embodiment of the present invention is illustrated.

In FIG. 14, the reference numeral 400 denotes a case defined with a space of a desired size therein. A guide hole 424 of a desired size is formed through the bottom wall of the case 400. A fixed shaft 402 is mounted on one inner wall of the case 400 in such a fashion that it is horizontally protruded from that inner wall.

The reference numeral 414 denotes a pivotal lever pivotally mounted at one end thereof on the fixed shaft 402 and protruded at the other end thereof through the guide hole 424 outwardly of the case 400. A return knob 404 is fixedly mounted to the other end of the pivotal lever 414. In order to pivot the pivotal lever 414 about the fixed shaft 402, a means for providing a pivoting force to the pivotal lever 410 is provided. That is, the pivotal lever 414 pivots about the fixed shaft 402 to a power cut-off position as it is repulsed by a magnetic force from an external electromagnet activated when it is desired to cut off the supply of electric power. The pivotal lever 414 can be returned to its original position, namely, a power supply position, as the user manually applies a force to the return knob 404. Thus, the pivotal lever 414 serves to switch on and off the supply of electric power.

Now, the means for providing a pivoting force to the pivotal lever 410 will be described. A first fixed magnet 406 is fitted around the upper portion of the pivotal lever 414. A solenoid 416 is mounted to one end of the first fixed magnet 406. The solenoid 416 functions as an electromagnet exhibiting a polarity arrangement opposite to that of the first fixed magnet 406 when it is activated. A second fixed magnet 422, which has the same polarity arrangement as that of the first fixed magnet 406, is fixedly arranged at a position spaced from the first fixed magnet 406 by a desired distance while facing the first fixed magnet 406.

The reference numeral 408 denotes a contact member fitted around the lower portion of the pivotal lever 414 for an application of electric power. A positive voltage input terminal 418, which receives a positive voltage from an external main power source, namely, the battery of the vehicle, is connected to one end of the contact member 408. A voltage output terminal 412, which outputs the positive voltage, is coupled to the other end of the contact member 408 via an electric wire 410.

A negative voltage supply terminal 420 is coupled to the solenoid 416 in order to supply a negative voltage from the external battery. The positive voltage input terminal 418, which receives the positive voltage from the battery, is also connected to the solenoids 416 so that the solenoid 416 receives the positive voltage for its activation.

An impact sensor is coupled to the negative voltage supply terminal 420. The impact sensor is configured in such a fashion that it is switched to its contact or closed state when it receives an impact of a predetermined level or greater, thereby allowing the negative voltage from the battery to be applied to the negative voltage supply terminal 420. Since the configuration of the impact sensor is the same as those of FIGS. 3*a*, 3*b*, and 4, its detailed description is omitted.

The operation of the automatic power cut-off device for emergency situations according to the third embodiment of the present invention will now be described.

In a normal running state of the vehicle, the impact sensor is maintained in such a fashion that the contact weight 126 is spaced from the contact ring 122, as shown in FIG. 3*b*.

In this state, no negative voltage is applied to the solenoid 416 which receives only the positive voltage from the battery via the positive voltage supply terminal 418. Accordingly, no magnetic force is generated from the solenoid 416. The positive voltage applied to the positive voltage supply terminal 418 is output to the voltage output terminal 412 via the contact member 408.

When the vehicle equipped with the above mentioned power cut-off device strikes against an obstacle, the impact sensing spring 124 provided in the impact sensor is bent due to an impact generated upon the striking of the vehicle, so that the contact weight 126 comes into contact with the contact ring 122, as shown in FIG. 4. As a result, the negative voltage input terminal 420 is electrically connected to the solenoid 416 via the impact sensor, namely, the connected contact ring 122, contact weight 126, impact sensing spring 124, and sensor output terminal 121, in this order. Accordingly, the negative voltage from the battery is applied to the negative voltage input terminal 420.

The negative voltage applied to the negative voltage supply terminal 420 is then supplied to the solenoid 416 which also always receives the positive voltage from the battery via the positive voltage input terminal 418. As the solenoid 416 receives both the negative voltage and positive voltage as mentioned above, it is activated to serve as an electromagnet exhibiting a polarity arrangement opposite to that of the first fixed magnet 406. That is, the solenoid 416 exhibits the same polarity as that of the first fixed magnet 406 at its end facing the first fixed magnet 406, so that it repulses the first fixed magnet 406. By the repulsion force of the solenoid 416, the first fixed magnet 406 is separated from the solenoid 416 and then moved toward the second fixed magnet 422 in accordance with a pivotal movement of the pivotal lever 414.

Figure 15:
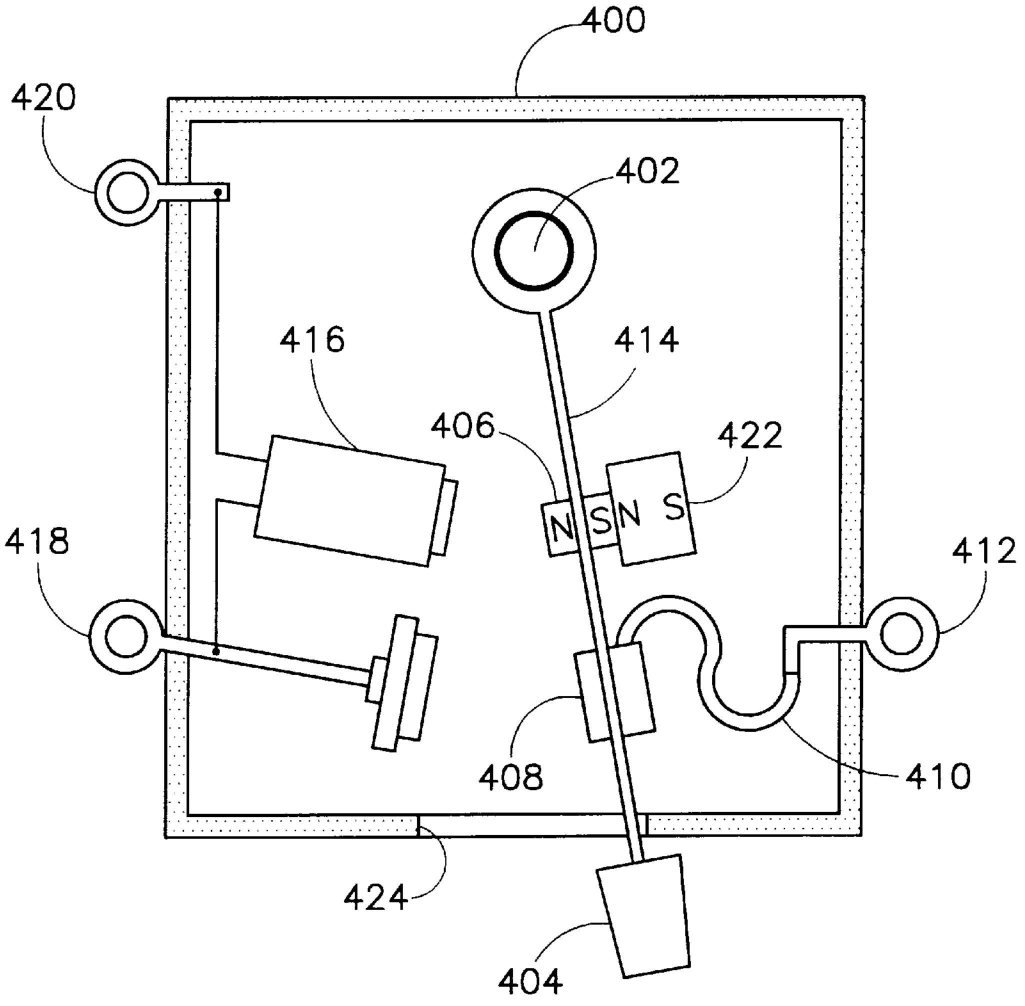
FIG. 15 is a sectional view similar to FIG. 14, but illustrating an operating state of the automatic power cut-off device according to the third embodiment of the present invention.

The first fixed magnet 406 is then attached to the second fixed magnet 422 by virtue of an attraction of the second fixed magnet 422, as shown in FIG. 15.

In the state in which the first fixed magnet 406 is attached to the second fixed magnet 422, the pivotal lever 414 disconnects the contact member 408 from the positive voltage supply terminal 418, as shown in FIG. 15. As a result, the supply of the positive voltage from the positive voltage supply terminal 418 to the voltage output terminal 412 is cut off.

On the other hand, where the vehicle is slightly damaged due to the striking thereof without any injury of the driver and other passengers in the vehicle, the driver manually pivot the return knob 404 protruded outwardly of the case 400 to the original position of FIG. 14 by applying a desired force to the return knob 404, in order to electrically connect again the contact member 408 to the positive voltage supply terminal 418. As a result, the supply of main electric power from the battery to the vehicle is enabled again. Accordingly, the vehicle can be run again.

Although the power cut-off device of the present invention has been described in conjunction with a single contact, it may be used in association with a plurality of contacts. The application of the power cut-off device is not limited to vehicles. In accordance with the present invention, the power cut-off device is applicable to airplanes.

As apparent from the above description, the present invention provides an automatic power cut-off device for emergency situations which is capable of immediately sensing occurrence of an emergency situation such as an accident of a vehicle or other transportation means striking against an obstacle during its running at a high speed, and automatically cutting off electric power flowing through the transportation means, thereby preventing the transportation means from catching fire or exploding due to a short circuit.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic power cut-off device for emergency situations comprising:

a solenoid electrically connected at one input terminal thereof to an external negative voltage input terminal, said solenoid having an engagement extension reciprocating along a straight path when said solenoid is activated;

a pair of connecting terminals arranged in parallel to each other, one of said connecting terminals being electrically connected to an external positive voltage input terminal, and the other one of said connecting terminals being electrically connected to a load;

a fixed bar attached at one end thereof to one of said connecting terminals;

a pivotal bar electrically connected to the other one of said connecting terminals and pivotally mounted at one end thereof in such a fashion that it pivots between a first position, in which it is in contact with said fixed bar, thereby electrically connecting said connecting terminals with each other, and a second position, in which it is separated from said fixed bar, thereby electrically disconnecting said connecting terminals from each other, said pivotal bar having an engagement portion at the other end thereof;

a tension coil spring adapted to urge said pivotal bar toward said second position;

a return knob arranged in such a fashion that it pivots between two positions respectively corresponding to said first and second positions of said pivotal bar to return said pivotal bar from said second position to said first position against a spring force of said tension coil spring, said return knob having a first engagement portion engaging with said engagement extension in an inactive state of said solenoid to maintain said pivotal bar at said first position, and a second engagement portion always engaging with said engagement portion of said pivotal bar; and an impact sensing device comprising an impact sensor adapted to sense an impact, thereby generating an impact sensing signal, said impact sensing device allowing a positive voltage from said positive voltage input terminal to be applied to said solenoid for an activation of said solenoid, in response to said impact sensing signal;

whereby said engagement extension of said solenoid is disengaged from said first engagement portion of said return knob when said impact sensor senses an impact, so that said pivotal bar pivots to said second position by virtue of said spring force of said tension coil spring, thereby cutting off the supply of said positive voltage.

2. The automatic power cut-off device in accordance with claim 1, wherein said impact sensing device comprises:

said impact sensor having a connecting terminal connected to said external negative voltage input terminal, and a sensor output terminal adapted to output said negative voltage received from said external negative voltage input terminal, said impact sensor outputting said negative voltage as said impact sensing signal when it senses an impact; and a solenoid driving circuit adapted to allow said positive voltage from said positive voltage input terminal to be applied to said solenoid, in response to said impact sensing signal, thereby activating said solenoid, said solenoid driving circuit comprising a transistor coupled at a base thereof to said sensor output terminal of said impact sensor via a diode and a resistor connected to each other in series, said transistor being also coupled at a collector thereof to a positive terminal of said solenoid and at emitter thereof to said external positive voltage input terminal, and a capacitor coupled at a negative terminal thereof to a node between said diode and said resistor and at a positive terminal thereof to said external positive voltage input terminal.

3. The automatic power cut-off device in accordance with claim 2, wherein said impact sensor comprises:

a box-shaped sensor case horizontally arranged in a running direction of the vehicle and defined with a cylindrical space therein, said sensor case having a sealed construction to prevent dust or other foreign matters from entering said circular space;

a cylindrical contact ring fitted in said cylindrical space in such a fashion that an outer surface thereof is in contact with an inner side surface of said sensor case, said contact ring having a lower end fitted in a circular groove defined at an inner bottom surface of said sensor case;

an impact sensing spring vertically arranged in said cylindrical space and centrally inserted into a bottom wall of said sensor case at a lower end thereof, said impact sensing spring being bent by an external impact applied to said sensor case;

a contact weight mounted to an upper end of said impact sensing spring, said contact weight coming into contact with said contact ring when said impact sensing spring is bent;

said connecting terminal having one end outwardly exposed at an outer side surface of said sensor case and electrically connected to said external negative voltage input terminal, said connecting terminal also having the other end inserted into said bottom wall of said sensor case and electrically connected to said contact ring; and said sensor output terminal having one end outwardly exposed at said outer side surface of said sensor case and electrically connected to said base of said transistor, said sensor output terminal also having the other end inserted into said bottom wall of said sensor case and electrically connected to said impact sensing spring.

4. An automatic power cut-off device for emergency situations comprising:

a motor electrically connected at one terminal thereof to an external negative voltage input terminal, said motor having a gear fixedly mounted to a rotating shaft thereof;

a rotating disk having a gear portion formed along a peripheral surface of a half portion thereof and adapted to engage with said gear of said motor, and a pair of protrusions protruded from a peripheral surface of the remaining half portion thereof, said protrusions being spaced from each other by a desired angle, said rotating disk also having a cylindrical member centrally arranged thereon, and a conductor member extending diametrically through said cylindrical member in such a fashion that opposite ends thereof are exposed at an outer surface of said cylindrical member;

a support member arranged adjacent to one of said protrusions of said rotating disk, said support member having a pair of guide grooves;

a pair of connecting terminals arranged in parallel to each other, one of said connecting terminals being electrically connected at one-side end thereof to an external positive voltage input terminal, and the other one of said connecting terminals being connected at one-side end thereof to a load;

a pair of connecting bars fixed at respective one-side ends thereof to respective other-side ends of said connecting terminals, said connecting bars extending through said guide grooves of said support member in parallel to each other and having a pair of facing contact terminal tips attached to respective other-side ends thereof and selectively in contact with opposite surfaces of said conductor member, respectively;

an impact sensing device comprising an impact sensor adapted to sense an impact, thereby generating an impact sensing signal, said impact sensing device allowing a positive voltage from said positive voltage input terminal to be applied to said motor for a rotation of said motor, in response to said impact sensing signal; and a pair of switching units arranged at opposite sides of said rotating disk, respectively, said switching units being switched to their open states by a force applied thereto from said protrusions of said rotating disk, thereby cutting off the application of said positive voltage to said motor so as to stop said motor, respectively;

whereby said rotating disk rotates as said motor rotates when said impact sensor senses an impact, so that said contact terminal tips of said connecting bars are separated from said conductor member, thereby cutting off the supply of said positive voltage.

5. The automatic power cut-off device in accordance with claim 4, wherein said impact sensing device comprises:

a motor switching unit adapted to switch the rotation of said motor between normal and reverse directions, said motor switching unit comprising a plurality of common and fixed contacts, and an inductor coil electrically connected at one end thereof to said negative voltage input terminal;

said switching units serving to stop said motor rotating in said normal and reverse directions, respectively;

a return push button switch connected at one end thereof to a first one of said switching units and at the other end thereof to said external positive voltage input terminal;

said impact sensor having a connecting terminal connected to said external negative voltage input terminal, and a sensor output terminal adapted to output said negative voltage received from said external negative voltage input terminal, said impact sensor outputting said negative voltage as said impact sensing signal when it senses an impact; and a transistor coupled at a base thereof to said sensor output terminal of said impact sensor via a diode and a resistor connected to each other in series, said transistor being also coupled at a collector thereof to the other end of said inductor coil and at emitter thereof to a second one of said switching units; and a capacitor coupled at one terminal thereof to a node between said diode and said resistor and at the other terminal thereof to said external positive voltage input terminal.

6. An automatic power cut-off device comprising:

an impact sensor receiving a negative voltage from an external negative voltage source, said impact sensor serving to sense an impact of a predetermined level or greater, thereby outputting said negative voltage as an impact sensing signal;

a case defined with a space of a desired size therein, said case having a guide hole formed through a bottom wall thereof;

a positive voltage input terminal mounted in said case and adapted to receive a positive voltage from an external positive voltage source;

a pivotal lever pivotally mounted at one end thereof to said case and protruded at the other end thereof through said guide hole outwardly of said case;

means for providing a pivoting force to said pivotal lever, said means receiving said negative voltage from said impact sensor while receiving said positive voltage from said positive voltage input terminal, thereby generating a pivoting force for said pivotal lever; and a contact member operatively connected to said pivotal lever to move between a connection position, in which it connects said positive voltage input terminal with a voltage output terminal coupled to a load, and a disconnection position, in which it disconnects said positive voltage input terminal from said voltage output terminal.

7. The automatic power cut-off device in accordance with claim 6, wherein said pivotal force providing means comprises:

a solenoid activated upon receiving said negative voltage from said impact sensor while receiving said positive voltage from said positive voltage input terminal, thereby forming an electromagnet;

a first fixed magnet mounted on said pivotal lever while separably contacting said solenoid, said fixed magnet having a polarity arrangement opposite to said electromagnet formed by said solenoid in such a fashion that it is repulsed away from said electromagnet when said solenoid is activated; and a second fixed magnet fixedly arranged at a position spaced from the first fixed magnet by a desired distance while facing the first fixed magnet, said second fixed magnet having the same polarity arrangement as that of the first fixed magnet in such a fashion that it attracts said first fixed magnet repulsed away from said electromagnet when said solenoid is activated.

8. The automatic power cut-off device in accordance with claim 6, further comprising:

a return knob mounted at the other end of said pivotal lever and adapted to return said contact member from said disconnection position to said connection position.

* * * * *